United States Patent
Rissi

(10) Patent No.: US 6,517,281 B1
(45) Date of Patent: Feb. 11, 2003

(54) ADJUSTABLE SPINNER FOR A PARTICULATE MATERIAL SPREADER

(75) Inventor: Matthew W. Rissi, Hiawatha, IA (US)

(73) Assignee: Highway Equipment Company, Cedar Rapids, IA (US)

( * ) Notice: Subject to any disclaimer, the term of this patent is extended or adjusted under 35 U.S.C. 154(b) by 0 days.

(21) Appl. No.: 09/574,600

(22) Filed: May 19, 2000

(51) Int. Cl.$^7$ ............................................. E01C 19/20
(52) U.S. Cl. .................. 404/110; 404/108; 239/659; 239/661; 239/667; 239/665; 239/668; 239/673
(58) Field of Search ............................ 404/101, 110, 404/108; 414/503, 528; 239/165 D, 657, 659, 661, 665, 667, 668, 672, 673

(56) References Cited

U.S. PATENT DOCUMENTS

| | | | | |
|---|---|---|---|---|
| 3,618,824 A | * | 11/1971 | Seymour | 239/666 |
| 3,652,019 A | | 3/1972 | Van Der Lely | 239/682 |
| 3,703,260 A | * | 11/1972 | Grabske | 239/666 |
| 3,790,090 A | * | 2/1974 | Lorenc et al. | 239/666 |
| 3,889,883 A | * | 6/1975 | Anderson | 239/679 |
| 3,966,124 A | | 6/1976 | Sukup | 239/666 |
| 4,124,167 A | * | 11/1978 | Coleman | 239/673 |
| 4,169,559 A | | 10/1979 | McKee | 239/672 |
| 4,216,914 A | | 8/1980 | O'Hanlon | 239/666 |
| 4,266,731 A | | 5/1981 | Musso, Jr. | 239/676 |
| 4,351,481 A | | 9/1982 | Dreyer | 239/670 |
| 4,561,596 A | | 12/1985 | Siwersson et al. | 239/687 |
| 4,597,531 A | * | 7/1986 | Kise | 239/650 |
| 4,685,619 A | * | 8/1987 | Harder | 239/1 |
| 4,765,772 A | * | 8/1988 | Benedetti et al. | 404/77 |
| 4,886,214 A | * | 12/1989 | Musso, Jr. et al. | 239/676 |
| 5,046,664 A | | 9/1991 | Van Der Lely et al. | 239/661 |
| 5,310,119 A | | 5/1994 | Musso, Jr. et al. | 239/672 |
| 5,397,172 A | | 3/1995 | Musso, Jr. et al. | 298/22 R |
| 5,400,974 A | | 3/1995 | Musso, Jr. et al. | 239/672 |
| 5,437,499 A | | 8/1995 | Musso | 298/26 |
| 5,466,112 A | * | 11/1995 | Feller | 414/528 |
| 5,618,002 A | | 4/1997 | Cervelli et al. | 239/657 |
| 5,772,389 A | | 6/1998 | Feller | 414/489 |
| 5,795,124 A | * | 8/1998 | Kitten et al. | 404/528 |
| 5,842,649 A | * | 12/1998 | Beck et al. | 239/677 |
| 5,911,362 A | * | 6/1999 | Wood et al. | 239/1 |
| 5,944,046 A | | 8/1999 | Hultine | 137/351 |
| 5,961,040 A | * | 10/1999 | Traylor et al. | 239/1 |
| 6,027,053 A | * | 2/2000 | Anderson et al. | 239/681 |
| 6,089,478 A | * | 7/2000 | Truan et al. | 239/675 |
| 6,123,276 A | * | 9/2000 | Ungerer et al. | 239/675 |
| 6,149,079 A | * | 11/2000 | Kinkead et al. | 239/668 |
| 6,186,731 B1 | * | 2/2001 | Vickers et al. | 414/528 |
| 6,202,944 B1 | * | 3/2001 | McCrory | 239/658 |
| 6,220,532 B1 | * | 4/2001 | Manon et al. | 239/672 |

FOREIGN PATENT DOCUMENTS

| | | | | |
|---|---|---|---|---|
| CA | 2206630 | | 6/1998 | ............ E01H/10/00 |
| GB | 2120914 A | * | 5/1983 | ............ E01C/19/20 |
| GB | 2154112 A | * | 2/1984 | ............ A01C/17/00 |
| WO | WO 92/15755 | * | 9/1992 | ............ E01C/19/20 |

\* cited by examiner

*Primary Examiner*—Thomas B. Will
*Assistant Examiner*—Alexandra K. Pechhold
(74) *Attorney, Agent, or Firm*—Simmons, Perrine, Albright & Ellwood, PLC

(57) ABSTRACT

A particulate material spreader includes an adjustable spinner apparatus which is incrementally adjustable forwardly and rearwardly to a plurality of operating positions relative to the discharge end of the material conveyor. The adjustment may be manual or automatic to adjust the drop point of the material onto the spinners, thereby accommodating varying application rates of the particulate material on a field, lawn, road, or other area. The spreader may be operatively connected to a microprocessor to receive data input and sensor feedback for variable rate technology.

20 Claims, 7 Drawing Sheets

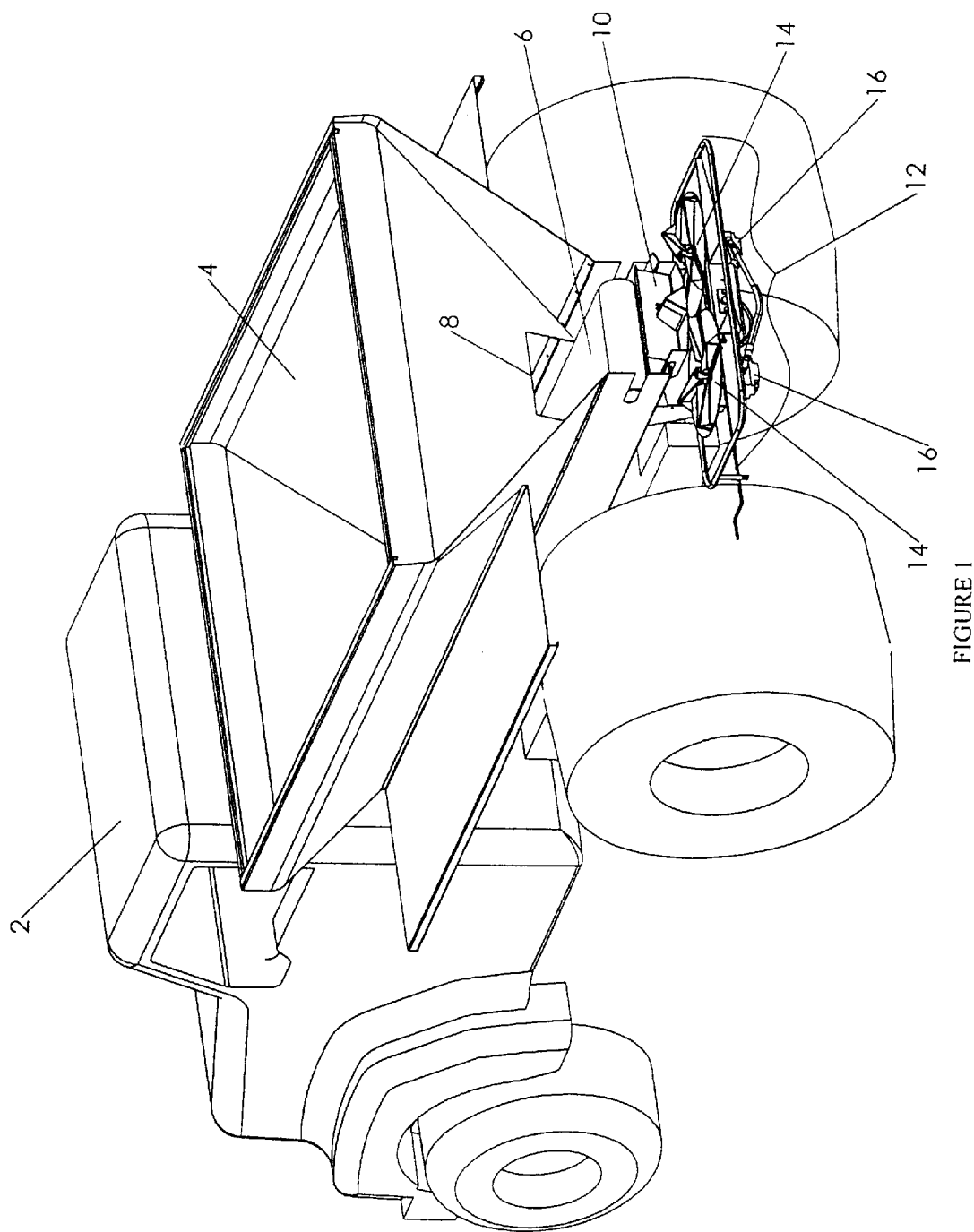

ADJUSTABLE SPINNER FOR A PARTICULATE MATERIAL SPREADER

BACKGROUND OF THE INVENTION

Spinner spreaders for particulate material are well known in the art, both for agricultural application, lawn care, and road maintenance application. Typically, such spreaders are mounted onto a truck body, truck chassis, trailer, or slid into a truck's dump body. The spreader includes a material storage bin(s), a conveyor system(s) and rotating spinner(s). The conveyor transfers material from the storage bin(s) to the spinner(s). The spinner(s) broadcast the material across the field, lawn, or road. Usually a single spinner or a pair of laterally spaced spinners are provided, with a material divider plate positioned above the spinner(s) to direct the material from the discharge end of the conveyor(s) onto the spinner(s). A wide range of spinner diameters are in use with a general understanding that the amount of material to be spread and the size of the broadcast area are proportional to the diameter of the spinners.

Recently, a new technology has emerged known as variable rate technology. Unlike the past when it was desirable to apply a constant rate of material per acre or lane mile, variable rate technology advances the benefits of varying rates while moving across the field, lawn, or roadway. As it relates to agriculture, it is now desirable to apply different rate of a material in different grids of the same field in order to obtain optimum pH and/or fertility values over the entire field. As for roadways, it is now common practice, for example, to apply a varying rate of de-icing materials during the winter depending on the grade of the road; increasing rates on steep roads or at intersections while decreasing rates on less traveled or level roads. This new variable rate technology has challenged makers of broadcast spreaders to provide a spreader that can achieve optimum spread patterns while applying varying low and high rates of materials while the spreader is traveling at variable ground speeds (MPH) over the field, lawn or road. Variable ground speeds combined with variable application rates result in a variable amount of material (cubic feet per minute) passing across the spinner(s). As the rate of material changes, it is necessary to change the drop point onto the spinner(s) to achieve optimal spread patterns.

Furthermore, it is common to spread different density materials with the same spreader, which makes it necessary to change the drop point onto the spinner(s) to achieve optimal spread patterns when switching from high to low density material applications.

In conventional prior art spreaders, the drop area of the material from the conveyor(s) is fixed in relationship to the spinner(s). Minor adjustability of the drop area has been accommodated by adjusting the position of a material divider(s) such that the material is deflected by the divider(s) onto a different drop area on the spinner(s). However, such movement of the divider(s) relative to the spinner(s) does not provide uniform material flow through the divider(s) creating difficulty in achieving uniform spread patterns. Furthermore, the aperture of the divider(s) must be large enough to accommodate the highest rate of application lest it would hinder material flow onto the spinner(s). The divider aperture therefore creates a null zone where the divider setting or the divider movement has no consistent affect on the drop area of the material during a change from high to low rate applications. Also, the movement of the divider(s) is substantially limited due to the structure of the divider and/or conveyor and does not allow for the proper material placement on the spinner for achieving optimum spread patterns of both low and high rates of material. Therefore, the limitations of a conventional prior art spreader does not allow achieving optimal spread patterns when applying variable volume rates of material or different densities of material.

Accordingly, a primary objective of the present invention is the provision of an improved particulate material spreader that achieves proper placement of both low and high volumetric and density based rates of material.

Another objective of the present invention is the provision of a particulate material spreader having spinner(s) which are incrementally adjustable, fore and aft, relative to the conveyor(s) discharge end and material divider(s).

A further objective of the present invention is the provision of an improved spreader for agricultural, lawn care, and road maintenance use with uniform material flow from the conveyor(s) discharge end through the material divider(s) and onto the adjustable spinner(s) of the spreader.

Another objective of the present invention is the provision of an improved particulate material spreader wherein the position of the spinner(s) is quickly and easily adjustable.

A further objective of the present invention is the provision of spinner(s) for particulate material spreader which can be manually adjusted to accommodate varying low and high application rates of material onto an area, such as a field, lawn or road.

Another objective of the present invention is the provision of an improved particulate material spreader to automatically adjust the spinner(s) position, fore and aft in relationship to the conveyor discharge end and material divider, based on the rate being applied while the spreader is moving over the field, lawn, or road at either fixed or variable ground speeds (MPH).

These and other objectives will become apparent from the following description of the invention.

SUMMARY OF THE INVENTION

The adjustable spinner of the present invention is adapted for use with a spreader for broadcasting particulate material onto a field, lawn, road, or other area. The spinner includes a frame which is adapted to be adjustably mounted to the spreader beneath a conveyor discharge end and a material divider. Spinner disc(s) and blades are rotatably mounted on the spinner frame and adapted to receive material from the conveyor through the material divider and broadcast the material as the truck or trailer moves through the field, lawn, or along a road. The position of the spinner(s) relative to the conveyor discharge end and material divider is adjustable, either manually or automatically, with or without automatic position feedback, by any number of means such as mechanical, electrical, pneumatic, or hydraulic, so as to adjust the drop point of the material onto the spinner(s), and thereby accommodate varying application rates of the particulate material.

BRIEF DESCRIPTION OF DRAWINGS

FIG. 1—overview of truck mounted material storage box, divider, and spinner spreader.

DETAIL DESCRIPTION OF THE DRAWINGS

Figure 2A:
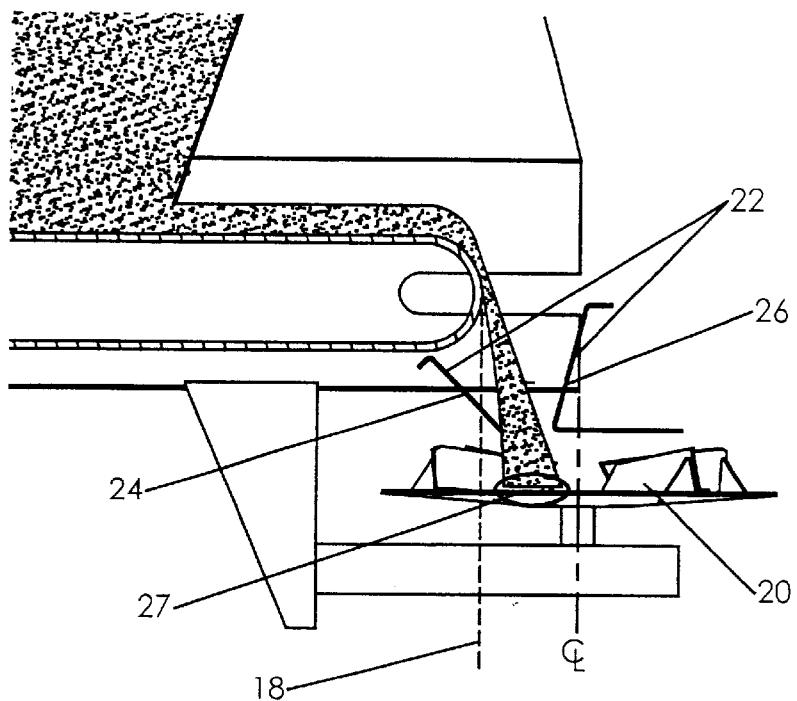
FIG. 2A—prior art cross section view of the discharge area, divider, and spinner with divider in a forward position.

FIG. 1 is a somewhat diagrammatic perspective view of a truck for spreading particulate material generally designated 2. The truck 2 includes a material storage bin 4 with sloping side walls and a belt conveyor 6 for transporting material to the discharge opening 8. Mounted at the rear of the material storage bin 4 at the discharge end of the conveyor is a material divider 10. Mounted below the material divider 10 is the spinner spreader apparatus generally designated 12.

The spinner spreader 12 of FIG. 1 consists of spinners 14 mounted to motors 16 positioned to accept materials falling from the conveyor end 18 and through material divider 10.

The above described structure is conventional and does not constitute a part of the present invention.

FIG. 2A is a somewhat diagrammatic longitudinal section view of conventional prior art showing a spinner 20 fixed in relative position to the conveyor end 18 and a moveable material divider 22 in a full forward position with a quantity of material falling through the divider aperture without influence from the divider front surface 24 or rear surface 26. It is obvious that the divider would need to move significantly rearward before affecting where this quantity of material is dropped onto the fixed position spinner 20. At the same time, a larger quantity of material flowing from conveyor end 18 may strike the rear surface 26 of the divider. There is no consistent relationship between the drop area 27 on the spinner, the material flow and divider setting.

Figure 2B:
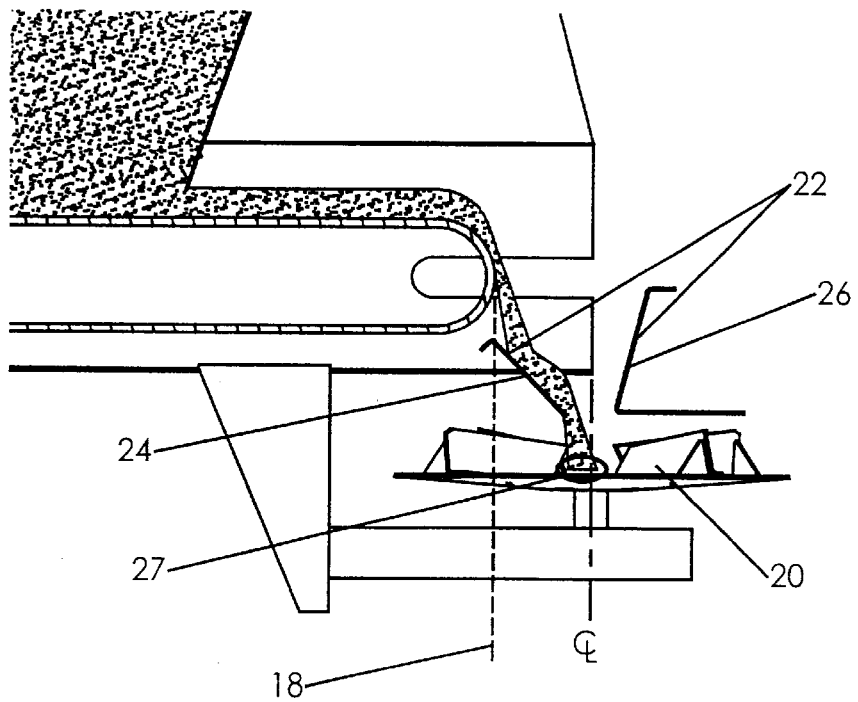
FIG. 2B—prior art cross section view of the discharge area, divider, and spinner with divider in a rearward position.

FIG. 2B is a somewhat diagrammatic longitudinal section view of conventional prior art similar to FIG. 2A, but showing a moveable material divider 22 in a rearward position with material falling through the divider aperture with influence from the divider front surface 24. It is obvious that the divider front surface 24 would affect the shape of the column of material as the divider 22 is moved fore and aft. The drop area 27 on the fixed spinner 20 changes accordingly with the shape of the material column.

Figure 3A:
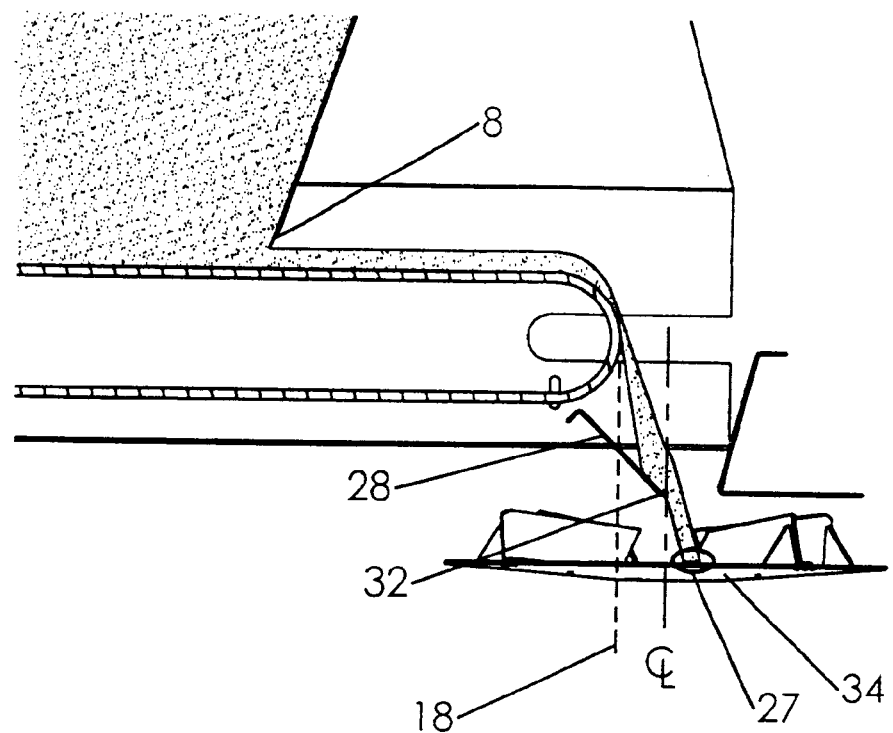
FIG. 3A—present invention cross section view of the discharge area, fixed position divider, and adjustable spinner (s) in a forward position.

FIG. 3A is a somewhat diagrammatic longitudinal section view of the present invention showing material falling from the conveyor end 18 onto the front surface 28 of a fixed divider 30, off a fixed drop edge 32, through the front part of the divider aperture, and at a drop point 27 on a moveable spinner 34 shown in a forward position. Divider 30 is not required for the present invention to operate as intended. With divider 30 removed, the conveyor end 18 will serve the same function as the fixed drop edge of a divider.

Figure 3B:
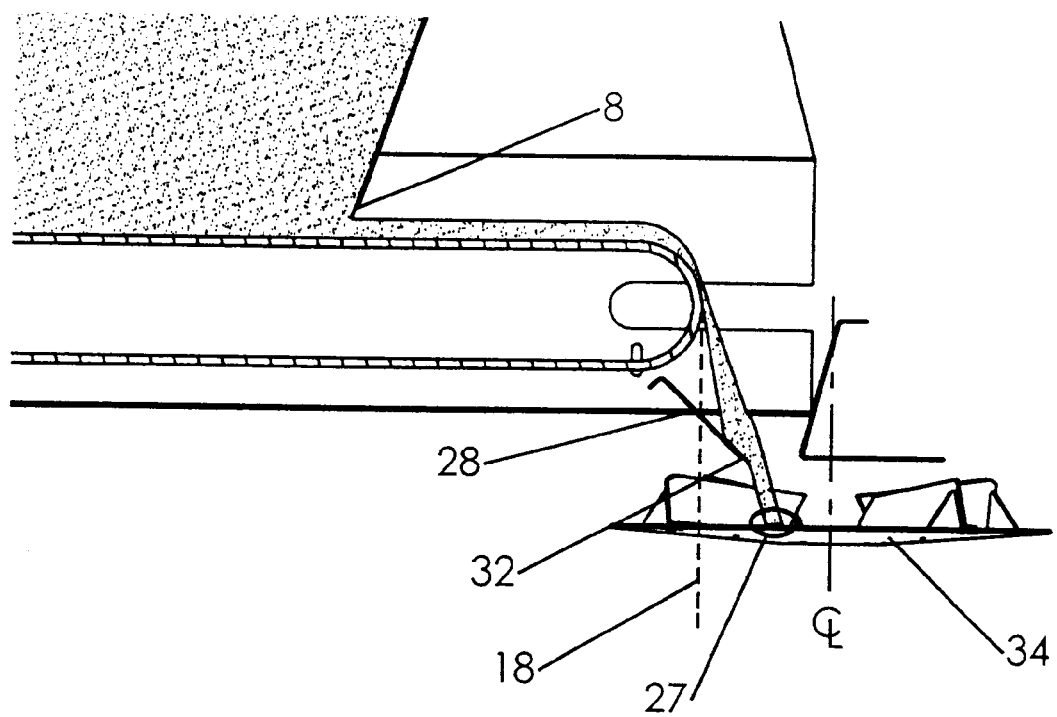
FIG. 3B—present invention cross section view of the discharge area, fixed position divider, and adjustable spinner (s) in a rearward position.

FIG. 3B is a somewhat diagrammatic longitudinal section view of the present invention showing material falling from the conveyor end 18 onto the front surface 28 of a fixed divider 30, off a fixed drop edge 32, through the front part of the divided aperture, and at a drop point 27 on a moveable spinner 34 shown in a rearward position. It is obvious that the material is falling in the same column shape as shown in FIG. 3A but landing at a drop point 27 further rearward on the spinner. Because the material strikes the divider 30 consistently, the material arrives at the moveable spinner 34 consistently and will thus have a spread pattern consistent and repeatable with the location of moveable spinner 34 in relation to divider surface 28 and the fixed drop edge 32.

Figure 4:
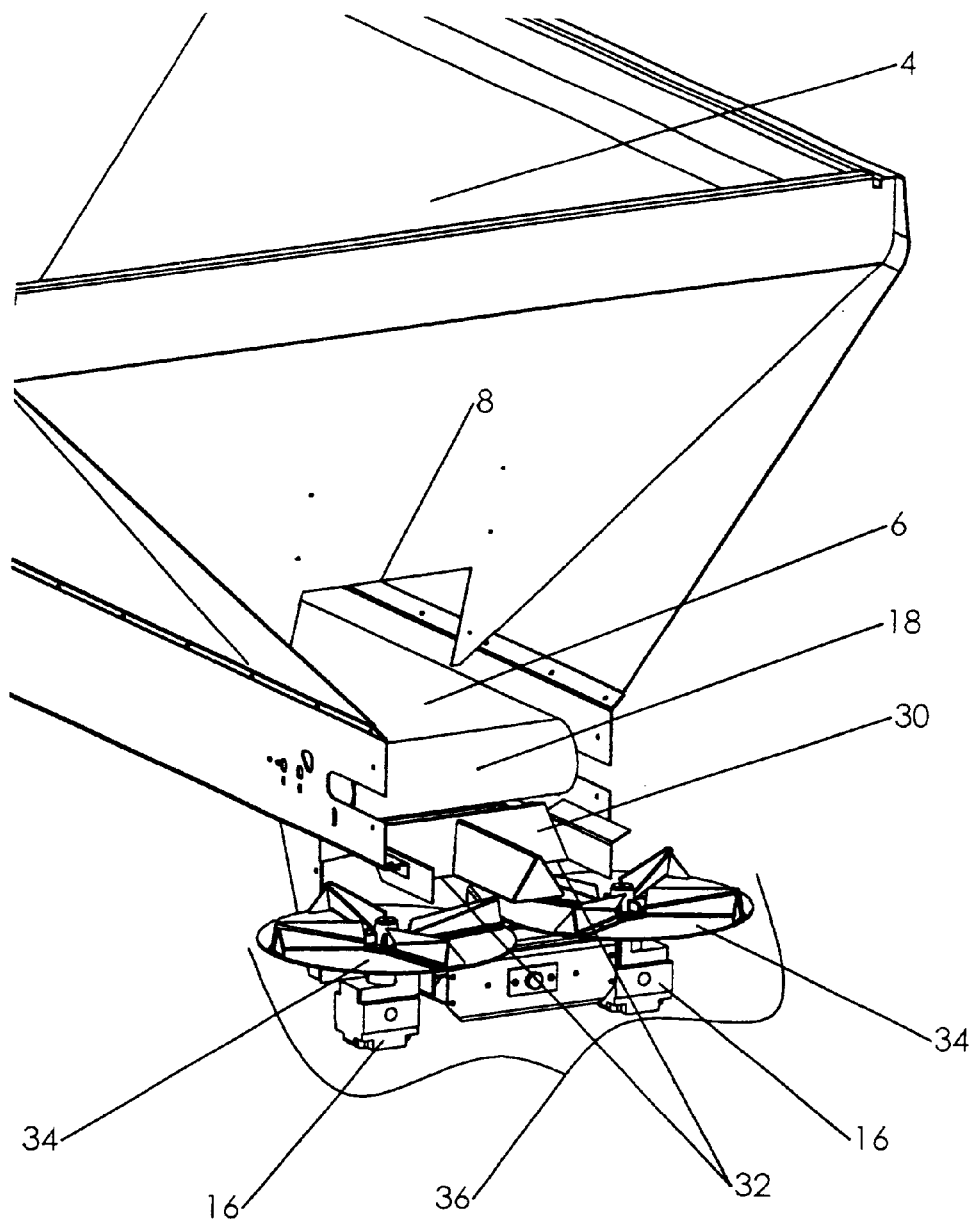
FIG. 4—perspective view of present invention in dual spinner configuration.

The present invention of the improved spreader generally designated 36 is shown in the perspective view of FIG. 4 in a dual spinner configuration. Material from storage bin 4 is conveyed through discharge opening 8 by conveyor 6 until the material falls from conveyor end 18 onto the front surface of fixed divider 30. The fixed divider 30 is mounted to the storage box 4 in a position fixed relative to the end of conveyor 18. The material further falls through the divider aperture along the same front edge, or drop edge 32, of divider 30 and onto the moveable spinners 34. It is the fixed drop edge 32 of the divider 30 that results in a consistent drop point 27 of material onto the moveable spinners 34. The spinners are rotated by motors 16 from below. The spinners rotate in opposite directions. The spinners and motors are moveable fore and aft relative to the fixed divider 30.

Figure 5A:
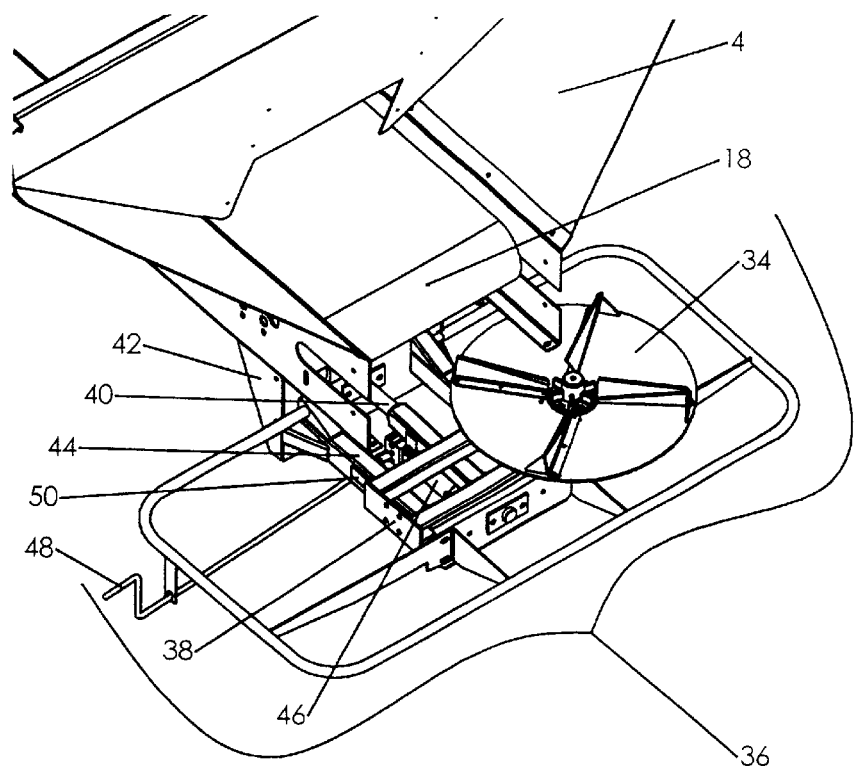
FIGS. 5A & 5B—perspective views of present invention in dual spinner configuration with one spinner, spinner motor, and divider removed.
Figure 5B:
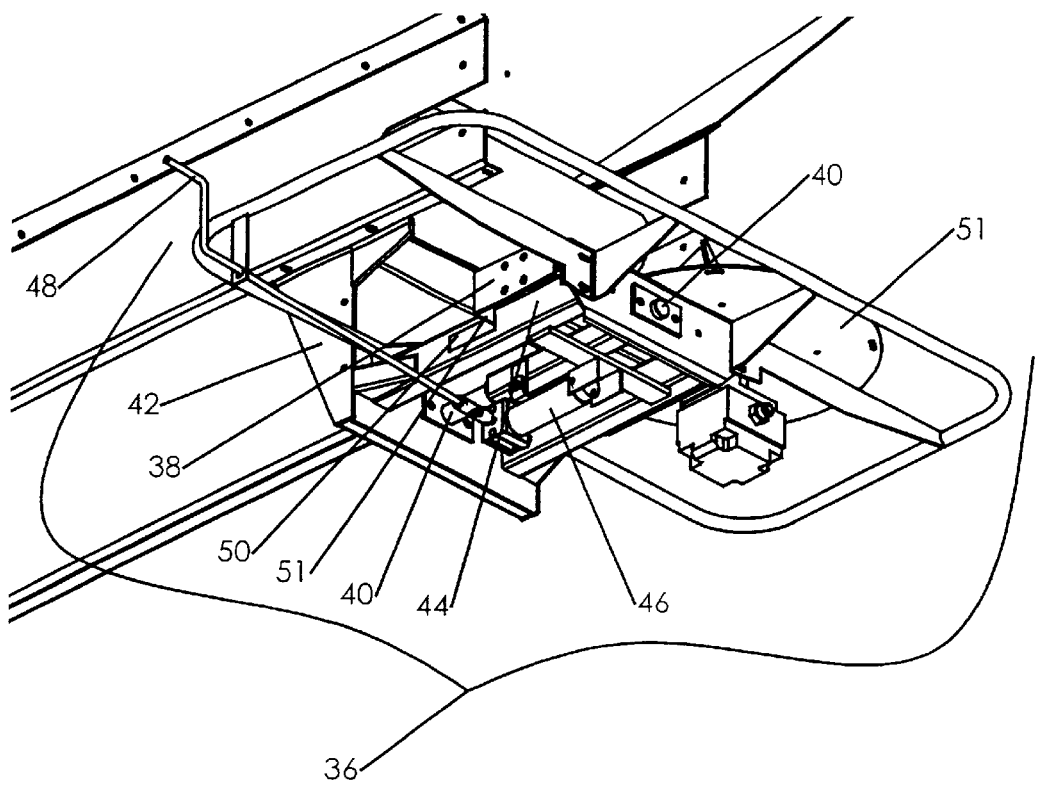

FIGS. 5A and 5B are upper and lower perspective views of the present invention in a dual spinner configuration spreader generally designated 36 with one spinner 34, spinner motor 16, and the fixed divider 30 of FIG. 4 removed. The spinners and motors are mounted to a subframe 38. In this configuration, the subframe 38 with mounted motors and spinners, is moveable fore and aft along longitudinal shaft 40 secured to main supporting frame 42. Further, the subframe 38 rests on longitudinal members 44 of the main supporting frame 42. The main supporting frame 42 is mounted to the storage bin 4 and is fixed in position relative to the conveyor end 18 and divider drop edge. In this configuration, fore and aft movement of the subframe 38 and the associated motors and spinners is accomplished through means of a screw jack 46 placed between the main supporting frame 42 and subframe 38. In manually operated form, the operator of the spreader can adjust the position of the spinners relative to the conveyor end and divider drop edge by extending or collapsing the screw jack 46 by means of a rotatable handle 48. Location of the spinners relative to the drop edge is indicated by scale 50 and pointer 51.

When using laterally spaced spinners having opposite rotation, the operator can adjust for higher or lower application rates by moving the spinners 34 forward or rearward with respect to the fixed drop edge 32 of the fixed divider 30.

Figure 6B:
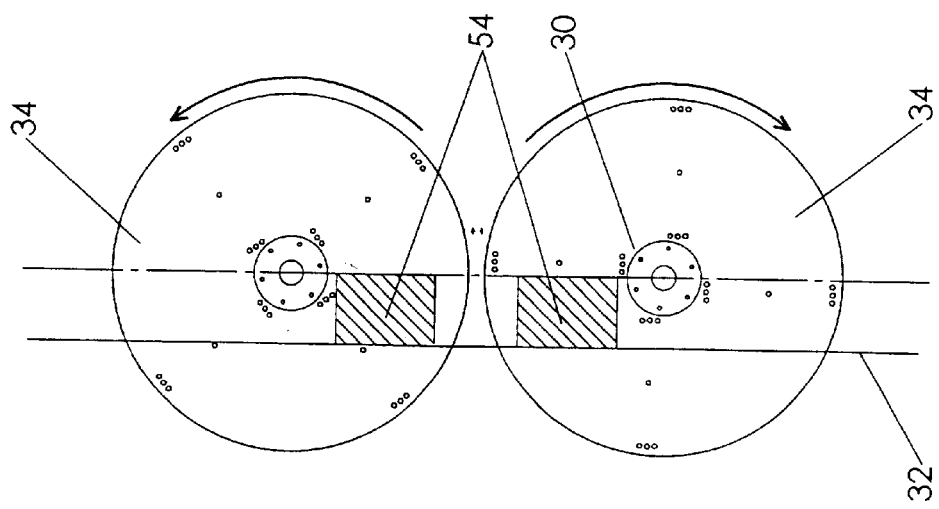
FIG. 6B—top view of spinners of present invention with spinners in forward position.
Figure 6A:
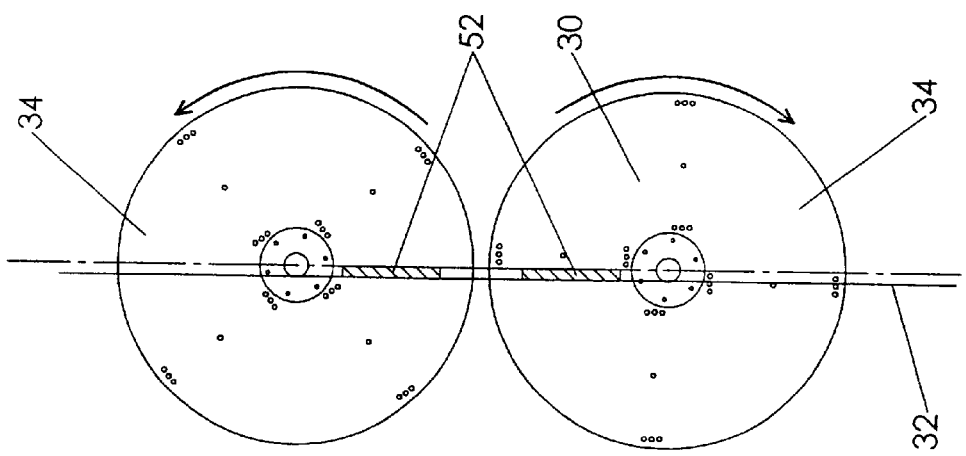
FIG. 6A—top view of spinners of present invention with spinner in rearward position.

FIG. 6A is a top view of the spinners of the present invention depicting a low application rate with a small column of material, represented by hatched sections 52, which has passed over the front surface of the divider, off the drop edge 32 and onto the spinners 34. The spinners 34 are retracted forwardly such that the small column of material 54 has a drop point near the spinners centerline. Furthermore, as the rate of material is reduced, the material would be introduced later in respect to the spinner's rotation. For any spinner rotation, as the rate of material is reduced, the column of material 52 and the associated drop point, would move in the same direction as the spinner rotation.

FIG. 6B is a top view of the present invention showing a higher application rate, which has a larger column of material, represented by hatched sections 54. The spinners 34 are moved rearwardly such that the added volume of material is introduced earlier in respect to the spinner's rotation. The center of the drop point moves in a direction opposite the spinner rotation. For any spinner rotation, as the rate of material is increased, the column of material 54 and the associated drop point, would move in the direction opposite the spinner rotation.

The spinners 34 can be adjusted to any position between full extension and full retracted positions to accommodate various application rates of materials. Spinner location is also adjustable to accommodate varying material densities. The accurate adjustability of the spinners allow for a more accurate deposit of material onto the spinners, and thus more accurate application of the material onto the field, lawn, or road.

In an automatically adjustable form, the screw jack 46 of FIGS. 5A and 5B is replaced with any number of actuating means, such as mechanical electrical actuators, pneumatic cylinders, or hydraulic cylinders, with a positive feed back to control spinner location from the operator's driving position or other remote location. The operator can immediately adjust the spinner position for accurate broadcast of material based on an application rate.

Figure 7B:
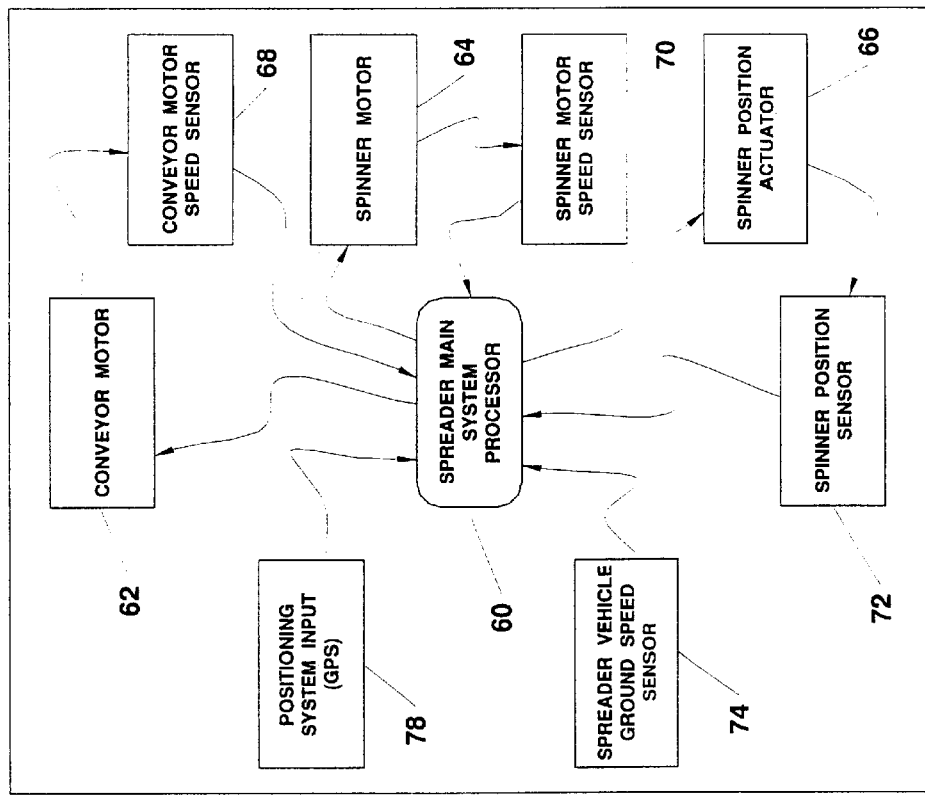
FIG. 7B—Logic schematic of automatic control for variable rate applications driven by a positioning system such as GPS.
Figure 7A:
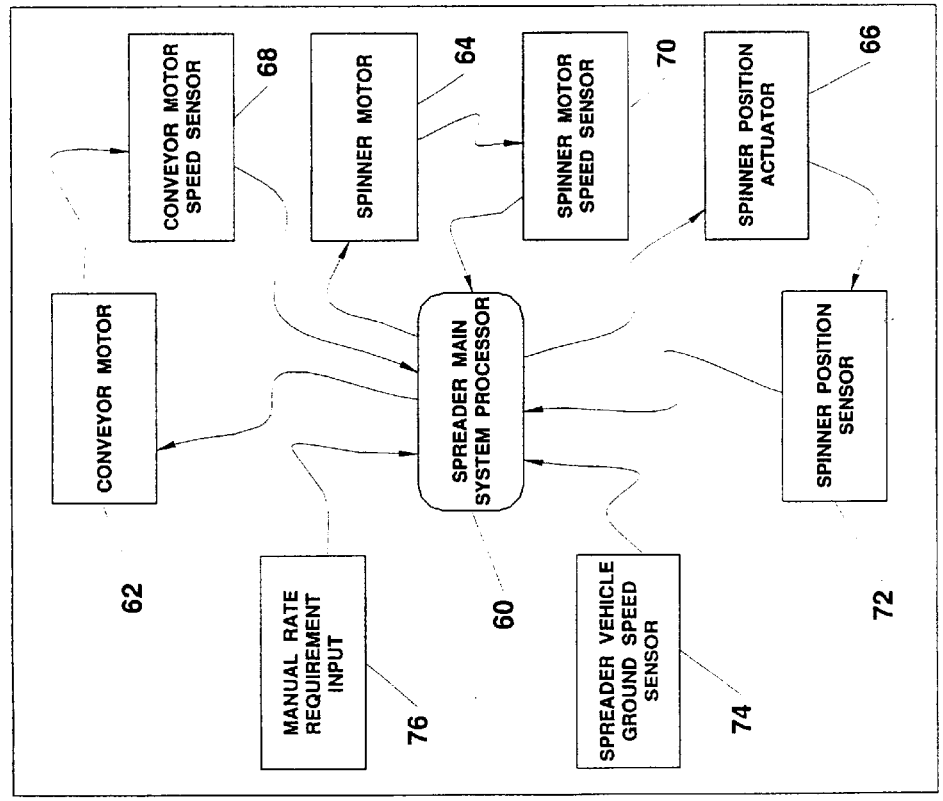
FIG. 7A—Logic schematic of automatic control for variable ground speed.

FIG. 7A is a logic flow chart of a general type of control for the remote adjustment just described. Spreader main system processor 60 controls conveyor motor 62, spinner motor 64, and spinner position actuator 66 by constantly monitoring conveyor speed sensor 68, spinner rotation speed sensor 70, spinner position actuator sensor 72 and vehicle ground speed sensor 74 to meet the rate requirements 76 manually input by the operator to meet predetermined material application rates. When a new rate requirement 76 is input, the main system processor 60 adjusts one or more of the conveyor motor speed 62, spinner speed 64, and spinner position actuator 66 until feedback from conveyor speed sensor 68, spinner speed sensor 70, and spinner position actuator sensor 66 meet programmed requirements for the new rate for any given vehicle speed from sensor 74. Specifically, it is the ability to change the drop point onto the spinners that allow for optimum spread patterns.

In a further automatically adjustable form, the screw jack 46 is replaced with any number of actuating means, such as mechanical electrical actuators, pneumatic cylinders, or hydraulic cylinders, with a positive feed back to control spinner location and thereby adjusting automatically for variable rate technology application of the particulate material. In this case, the spinner location is changed as the spreader is moving about the field, lawn or along the roadway for accurate broadcast of material based on predetermined application rates and position knowledge gained from a location positioning system such as a common Global Positioning System (GPS).

FIG. 7B is a logic flow chart of a general type of control for variable rate technology. With variable rate technology, the spreader main system processor 60 controls conveyor motor 62, spinner motor 64, and spinner position actuator 66 by constantly monitoring conveyor speed sensor 68, spinner rotation speed sensor 70, spinner position actuator sensor 72 and vehicle ground speed sensor 74, and a positioning system such as a common Global Positioning System 78. The addition of the positioning system and a set of predetermined variable application rate needs for a field grid or roadway gives the spreader the information necessary to apply different rates of material at variable ground speeds. However, it is the ability to consistently change the effective material drop point on the spinners that allows a spreader to achieve the optimal spread patterns needed for the variable ground speeds and high to low application rates. Therefore, as the spreader is moving about the field, lawn or along the roadway, the main system processor 60 constantly monitors and adjusts the spinner position for best results with regard to application rates based on the positioning system's location information and vehicle ground speed.

What is claimed is:

1. A truck for spreading particulate material, comprising:
   a truck chassis;
   a material storage box mounted on the chassis for holding particulate material, the box having a conveyor for moving particulate material through a discharge opening and off a conveyor end, thereby creating a stream of particulate material exiting said discharge opening;
   a spreader mounted to the box with rotating spinner apparatus incrementally and translatably adjustable fore and aft with respect to said stream in a plurality of operating positions with respect to said stream;
   a main support frame on the box for supporting the spreader and spinner apparatus;
   wherein the spreader with rotating spinner apparatus includes a moveable subframe mounted to the storage box, and at least one spinner rotatably mounted on the subframe for receiving the particulate material and distributing the material in a broadcast swath; and
   wherein the spreader spinner apparatus includes a rotatable screw connected between the main supporting frame and subframe whereby manual rotation of the screw incrementally adjusts the position of the moveable subframe and the spinner.

2. The truck of claim 1 wherein the rotatable screw connected between the spreader main supporting frame and moveable subframe is driven by an electric motor whereby incrementally adjusting the position of the moveable subframe and spinner.

3. The truck of claim 1 wherein the rotatable screw connected between the spreader main supporting frame and moveable subframe is driven by a hydraulic motor whereby incrementally adjusting the position of the moveable subframe and spinner.

4. The truck of claim 2 wherein the spinner apparatus moves in accordance to processor input(s) and sensor feedback for variable rate technology.

5. The truck of claim 3 wherein the spinner apparatus moves in accordance to processor input(s) and sensor feedback for variable rate technology.

6. A truck for spreading particulate material, comprising:
   a truck chassis;
   a material storage box mounted on the chassis for holding particulate material, the box having a conveyor for moving particulate material through a discharge opening and off a conveyor end, thereby creating a stream of particulate material exiting said discharge opening;
   a spreader mounted to the box with rotating spinner apparatus incrementally and translatably adjustable fore and aft with respect to said stream in a plurality of operating positions with respect to said stream;
   a main support frame on the box for supporting the spreader and spinner apparatus;
   wherein the spreader with rotating spinner apparatus includes a moveable subframe mounted to the storage box, and at least one spinner rotatably mounted on the subframe for receiving the particulate material and distributing the material in a broadcast swath; and wherein the spinner apparatus includes a linear hydraulic or electric actuator connected between the spreader main supporting frame and moveable subframe whereby operation incrementally adjusts the position of the moveable subframe and spinner.

7. The truck of claim 6 wherein the spinner apparatus moves in accordance to processor input(s) and sensor feedback for variable rate technology.

8. A particulate material spreader for spreading particulate material from a material storage box, comprising:

a spreader frame adapted to be mounted to the material storage box for discharging a stream of material;

a rotating spinner apparatus, including a moveable subframe, mounted to the spreader frame in a manner to accept said stream of material from the storage box;

a means for the rotating spinner apparatus to be incrementally and translatably adjustable fore and aft in a plurality of operating positions relative to said stream of material; and wherein the spinner apparatus includes a rotatable screw connected between the spreader frame and moveable subframe whereby manual rotation of the screw incrementally adjusts the position of the moveable subframe and spinner.

9. The spreader of claim 8 wherein the rotatable screw connected between the spreader frame and moveable subframe is driven by an electric motor thereby incrementally adjusting the position of the moveable subframe with spinner.

10. The spreader of claim 8 wherein the rotatable screw connected between the spreader frame and moveable subframe is driven by a hydraulic motor thereby incrementally adjusting the position of the moveable subframe with spinner.

11. The spreader of claim 9 wherein the spinner apparatus moves in accordance to processor input and sensor feedback for variable rate technology.

12. The spreader of claim 10 wherein the spinner apparatus moves in accordance to processor input and sensor feedback for variable rate technology.

13. A particulate material spreader for spreading particulate material from a material storage box, comprising:

a spreader frame adapted to be mounted to the material storage box for discharging a stream of material;

a rotating spinner apparatus, including a moveable subframe, mounted to the spreader frame in a manner to accept said stream of material from the storage box;

a means for the rotating spinner apparatus to be incrementally and translatably adjustable fore and aft in a plurality of operating positions relative to said stream of material; and wherein a divider placed between the conveyor discharge end and spinner to distribute material onto the spinner.

14. The spreader of claim 13 wherein the divider is fixed relative to the conveyor end.

15. A particulate material spreader for spreading particulate material from a material storage box, comprising:

a spreader frame adapted to be mounted to the material storage box for discharging a stream of material;

a rotating spinner apparatus, including a moveable subframe, mounted to the spreader frame in a manner to accept said stream of material from the storage box;

a means for the rotating spinner apparatus to be incrementally and translatably adjustable fore and aft in a plurality of operating positions relative to said stream of material; and wherein the spinner apparatus includes a linear hydraulic or electric actuator connected between the spreader frame and moveable subframe whereby operation incrementally adjusts the position of the moveable subframe spinner.

16. The spreader of claim 15 wherein the spinner apparatus moves in accordance to processor input and sensor feedback for variable rate technology.

17. A method of spreading particulate material from a truck, the truck having a material storage box for holding particulate material, the material box having a discharge opening and discharge means for discharging material from the box onto a spreader, the spreader having at least one rotatable spinner to broadcast the material over desired area, the method comprising:

translatably adjusting the position of the spinner fore or aft relative to the discharge of material so that the material is discharged onto one of a plurality of drop points on the spinner and thereby adjusting the broadcast of material from the spinner; and wherein the adjustment of the position of the spinner is accomplished by a rotatable screw connected between a fixed frame and moveable spreader spinner apparatus.

18. A method of spreading particulate material from a truck, the truck having a material storage box for holding particulate material, the material box having a discharge opening and discharge means for discharging material from the box onto a spreader, the spreader having at least one rotatable spinner to broadcast the material over desired area, the method comprising:

translatably adjusting the position of the spinner fore or aft relative to the discharge of material so that the material is discharged onto one of a plurality of drop points on the spinner and thereby adjusting the broadcast of material from the spinner; and wherein the adjustment of the position of the spinner is accomplished by electric, pneumatic, or hydraulic means connected between a fixed frame and moveable spreader spinner apparatus.

19. A material spreader comprising:

a frame, having a frame longitudinal axis;

a rotating plate having a plurality of radial members disposed thereon, said rotating plate configured to spin about a first axis which is substantially orthogonal to a plane of said plate;

means, coupled to said frame, for providing a stream of material having a predetermined flow edge;

means, coupled to said rotating plate, for moving said rotating plate, so that said predetermined flow edge of said stream of material is selectively incident upon varying drop points on said rotating plate;

wherein said means, coupled to said rotating plate, for moving said rotating plate, being configured to translate said rotating plate fore and aft along a second longitudinal axis, where said second longitudinal axis is substantially orthogonal to said first axis;

said frame is a frame of a vehicle;

said means, coupled to said frame, for providing a stream of material having a predetermined flow edge, is rigidly fixed at a single location on said frame;

said second longitudinal axis is parallel with said frame longitudinal axis;

a material container having a front end and a back end, said material container coupled to said frame;

a conveyor coupled to said frame, said conveyor having a conveyor axis which is parallel with said frame longitudinal axis, said conveyor axis extending from said front end to said back end where material is discharged;

conveyor regulation means for providing a variable volumetric flow rate for said stream of material; and, said means, coupled to said rotating plate, for moving said rotating plate, being configured to automatically move said rotating plate toward said front end when said variable volumetric flow rate is increased.

20. A material spreader comprising:

a frame, having a frame longitudinal axis;

a rotating plate having a plurality of radial members disposed thereon, said rotating plate configured to spin about a first axis which is substantially orthogonal to a plane of said plate;

means, coupled to said frame, for providing a stream of material having a predetermined flow edge;

means, coupled to said rotating plate, for moving said rotating plate, so that said predetermined flow edge of said stream of material is selectively incident upon varying drop points on said rotating plate;

said means, coupled to said rotating plate, for moving said rotating plate, and said means, coupled to said frame, for providing a stream are further configured, so that, for each incremental unidirectional adjustment of location of one of said rotating plate and said means for providing a stream, said predetermined flow edge of said stream of material is moved to a different drop point on said rotating plate.

* * * * *

UNITED STATES PATENT AND TRADEMARK OFFICE
CERTIFICATE OF CORRECTION

PATENT NO.      : 6,517,281 B1                                                              Page 1 of 1
DATED           : February 11, 2003
INVENTOR(S)     : Matthew W. Rissi It is certified that error appears in the above-identified patent and that said Letters Patent is hereby corrected as shown below:

Column 4,
Line 6, please delete the word "rearward" and insert therefor -- forward --.

Signed and Sealed this

Eighth Day of April, 2003

JAMES E. ROGAN
*Director of the United States Patent and Trademark Office*